G. W. WEMPLE.
APPARATUS FOR DEFIBERIZING MEATS.
APPLICATION FILED JAN. 23, 1908.

923,742.

Patented June 1, 1909.
3 SHEETS—SHEET 1.

Witnesses:
Howard Hanscom
Nathan D. Lombard

Inventor:
George W. Wemple,
by Walter E. Lombard,
Atty.

G. W. WEMPLE.
APPARATUS FOR DEFIBERIZING MEATS.
APPLICATION FILED JAN. 23, 1908.

923,742.

Patented June 1, 1909.
3 SHEETS—SHEET 2.

Witnesses:
Howard Hanscom
Nathan G. Lombard

Inventor:
George W. Wemple,
by Walter E. Lombard,
Atty.

G. W. WEMPLE.
APPARATUS FOR DEFIBERIZING MEATS.
APPLICATION FILED JAN. 23, 1908.
923,742.
Patented June 1, 1909.
3 SHEETS—SHEET 3.
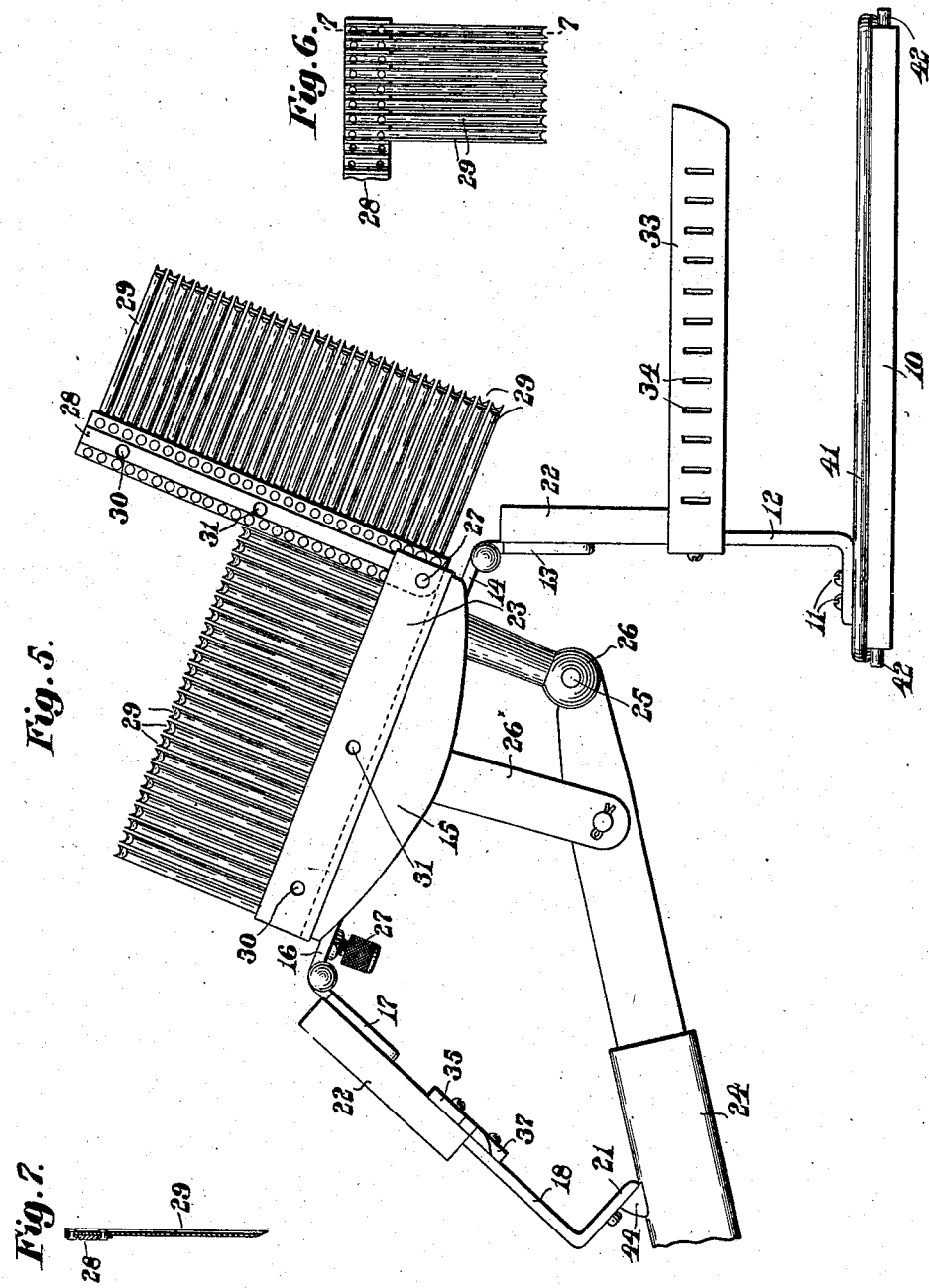
Witnesses:
Howard Hanscom
Nathan C. Lombard
Inventor:
George W. Wemple,
by Walter E. Lombard,
Atty.

UNITED STATES PATENT OFFICE.

GEORGE W. WEMPLE, OF BOSTON, MASSACHUSETTS, ASSIGNOR OF ONE-HALF TO JOHN C. L. SHEAFE, OF BROOKLINE, MASSACHUSETTS.

APPARATUS FOR DEFIBERIZING MEATS.

No. 923,742.　　　　Specification of Letters Patent.　　　　Patented June 1, 1909.

Application filed January 23, 1908. Serial No. 412,289.

*To all whom it may concern:*

Be it known that I, GEORGE W. WEMPLE, a citizen of the United States of America, and a resident of Boston, in the county of Suffolk and State of Massachusetts, have invented certain new and useful Improvements in Apparatus for Defiberizing Meats, of which the following is a specification.

This invention relates to devices for defiberizing meats and has for its object the production of an apparatus so constructed that a slice of steak or other meat may be acted upon simultaneously by a plurality of cutters to puncture the meat for any desired distance without severing the same, thereby leaving the opposite side of the slice of meat intact.

The invention consists in certain novel features of construction and arrangement of parts which will be readily understood by reference to the description of the drawings and to the claims hereinafter given.

Figure 1:
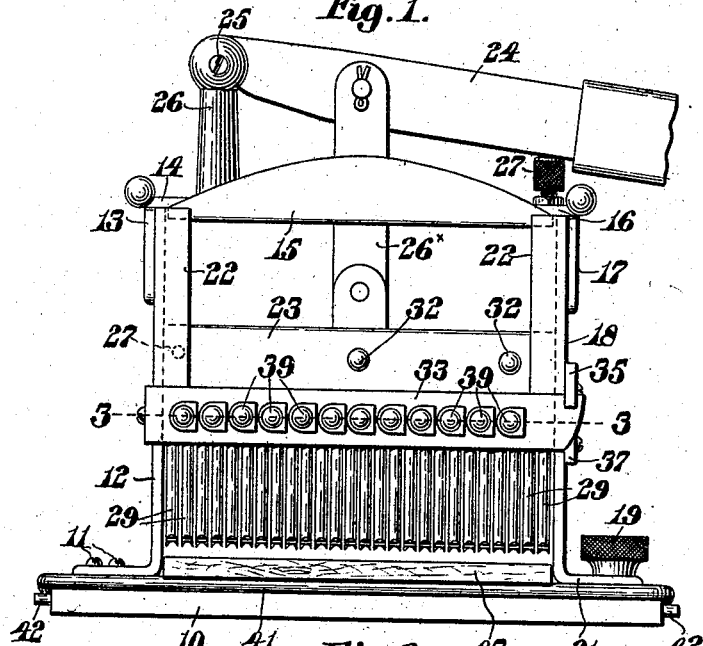
Figure 2:
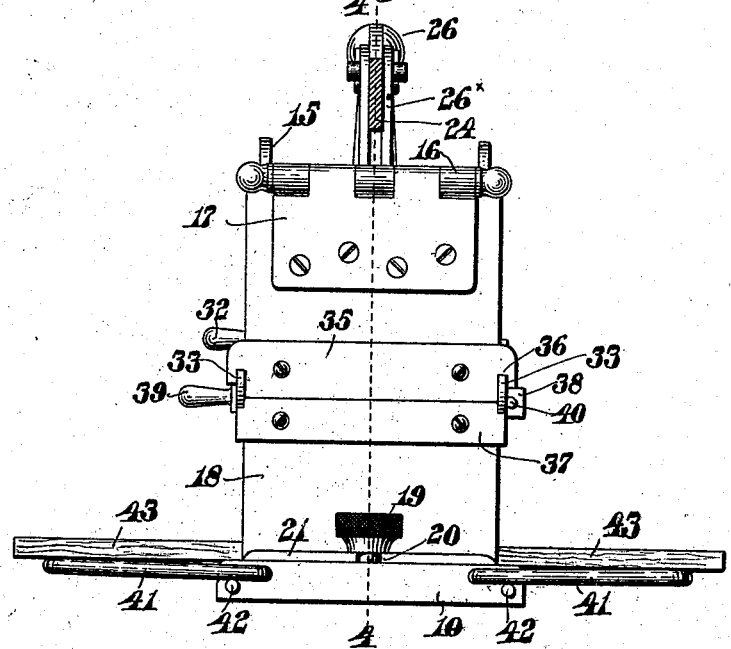
Figure 3:
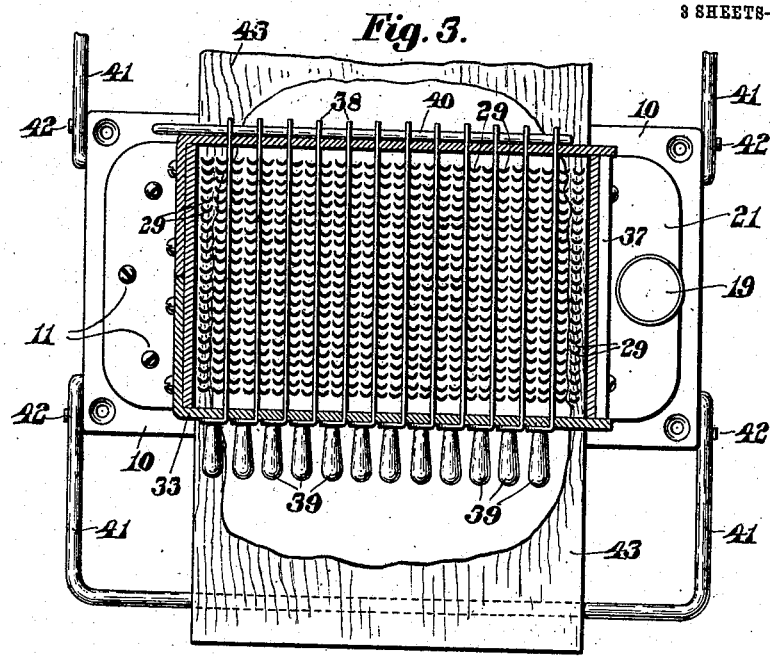
Figure 4:
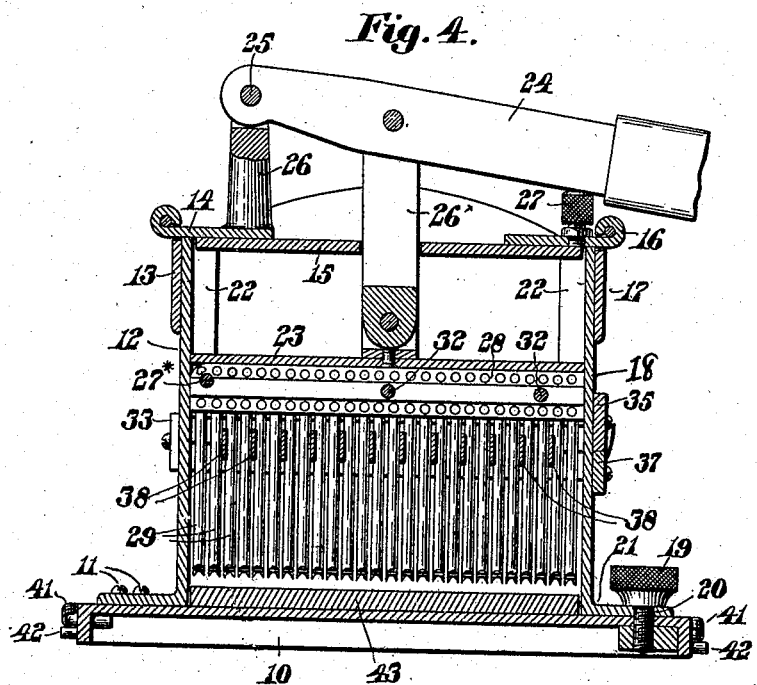

Of the drawings: Figure 1 represents a side elevation of a machine embodying the features of this invention. Fig. 2 represents an end view of the same. Fig. 3 represents a horizontal section of the same, the cutting plane being on line 3—3 on Fig. 1. Fig. 4 represents a vertical section of the same, the cutting plane being on line 4—4 on Fig. 2. Fig. 5 represents a side elevation of the same, the apparatus being shown opened in position to cleanse the cutters. Fig. 6 represents a detail of a portion of one of the cutter-carrying blades, with a plurality of cutters secured thereto, and Fig. 7 represents a section of the same, the cutting plane being on line 7—7 on Fig. 6.

Similar characters designate like parts throughout the several figures of the drawings.

In the drawings, 10 represents a suitable table to which is firmly secured by the screws 11 the standard 12. The upper end of this standard 12 has secured thereto one leaf 13 of a suitable hinge, the coöperating leaf 14 of which is secured to the top plate 15. The opposite end of said top plate 15 has secured thereto a leaf 16 of another hinge, the co-acting leaf of which is secured to the end plate 18 adapted normally to be held in position parallel to the standard 12 by means of the locking bolt 19 passing through a suitable hole 20 in the foot 21 of said plate and threaded to the frame 10.

The standard 12 and the end plate 18 are each provided with side wings 22 between which is adapted to reciprocate the member 23, the reciprocating movement for which being obtained by means of a handle 24 pivoted at 25 to an extension 26 from the top plate 15 and connected to the member 23 by a link 26*. To the top plate 15 is secured an adjustable stop 27 which limits the downward movement of the member 23.

Pivoted at 27* to the member 23 are a plurality of plates 28 each of which has riveted thereto a plurality of semi-circular cutters or puncturing devices 29, the lower ends of which are beveled off in such a manner as to leave two sharp points at the end of each cutter. Each of the plates 28 is provided with two holes 30 and 31, all of the holes 30 in the different plates being in alinement with one another and the holes 31 in the different plates being similarly alined when the plates 28 are in operative position. Pins 32 extending through these holes 30 and 31 and similarly alined holes in the side walls of the member 23 lock the plates 28 securely in position so that the ends of the cutters 29 all lie in the same plane.

Secured to the standard 12 are a pair of parallel arms 33 extending parallel to the table 10 toward the end plate 18, each of the arms 33 being provided with a plurality of oblong openings 34. The free ends of said arms 33 are prevented from spreading by means of the notched plate 35 secured to the end plate 18, said plate 35 having notches 36 at either end thereof into which the ends of the arms 33 extend. Another plate 37 secured to the end plate 18 coöperates with the plate 35 to prevent vertical movement of the free ends of the arms 33 when the device is being operated. Strips or plates 38 extend from one arm 33 to the other and through the openings 34 therein each of these plates or strips 38 being provided at one end with a suitable handle 39 by which they may be readily withdrawn, and at the other end with a suitable hole through which a locking piece 40 is inserted to prevent the removal of these strips 38 until such removal is required.

Pivoted to the table or bed 10 at either end thereof is a U-shaped member 41 supported in the position shown in Figs. 1 and 2 by means of the projecting pins or studs 42. On the ends of these U-shaped members 41 rests a wooden board or support 43 which extends between the standard 12 and the end plate 18 and normally rests upon the table 10. This board is adapted to be moved endwise between said standard 12 and the end plate 18, as desired.

In the operation of the invention, the handle 24 is lifted up so that the cutters are in their highest position and a piece of steak or other meat which it is desired to treat is placed upon the wooden support 43 and then inserted between the standard 12 and the end plate 18 with the support 43 resting upon the table 10. The operator then seizes the handle 24 and causes the downward movement of the reciprocating member 23, with the result that the plurality of cutters 29 penetrate the meat until further movement of the handle is prevented by means of the adjustable stop 27. This may be adjusted so that any thickness of meat may be left uncut or unpunctured by the cutters 29, as desired. When all of the cutters 29 have passed into the meat and the handle 24 comes to a stop against the adjustable stop 27, the handle is immediately raised and the meat will tend to follow with the cutters 29 but the strips 38 passing from one arm 33 to another between the knives 29 will act as strippers and remove the meat from the cutters so that it will again drop onto the support 43. The support 43 is then moved farther through the machine while yet resting upon the table 10 until a new section of the meat is beneath the cutters 29, when the operation will be repeated. The operation is continued until all of one side of the meat has been punctured by means of the plurality of cutters secured to the reciprocating member. This leaves one side of the steak intact and unpunctured, thus retaining all of the juice in the meat and preventing it from escaping in broiling or frying, thus retaining all of the nutrition, while at the same time the fibers are severed and the heat from the fire has access to a greater extent of the surface during the cooking.

The operation of the device upon the steak makes the steak very tender and at the same time facilitates its cutting when on the table.

In order to have the apparatus perfectly sanitary at all times, the framework is hinged together in the manner previously described and when it is desired to cleanse the different parts of the machine, the holding bolt 19 is removed and the framework is thrown back into the position shown in Fig. 5 so that the foot 21 rests against a stop 44. When in this position all of the interior parts of the framework may be readily cleansed and in order to cleanse the knives the pins 32 may be removed and each plate 28 thrown over into the position shown at the right of Fig. 5 about the pivot 27, thus permitting both sides of the knives 29 to be cleansed. As soon as all the knives on one plate 28 have been cleansed, it is thrown back into its normal position and the next moved into the position mentioned and the operation of cleansing is repeated. As soon as this has been accomplished, the parts may be easily returned to their normal position and locked in such position by the different devices heretofore described.

It is believed that the operation of the invention and the many advantages of a device of this character for the purpose of deliberizing meat will be fully apparent without further description.

Having thus described my invention, I claim:

1. In an apparatus of the class described, the combination of a support; vertical guides above said support; a member adapted to move toward and from said support within said guides; and a plurality of cutters mounted on said reciprocating member and extending toward said support each of said cutters being provided at its puncturing end with a sharp point on each side of its center.

2. In an apparatus of the class described, the combination of a support; vertical guides above said support; a member adapted to move toward and from said support within said guides; a plurality of cutters mounted on said reciprocating member and extending toward said support each of said cutters being provided at its puncturing end with a sharp point on each side of its center; and means for limiting the movement of said cutters toward said support.

3. In an apparatus of the class described, the combination of a support; a framework above said support provided with vertical guides; a member adapted to move toward and from said support within said guides; a plurality of cutters having knife-edged ends mounted on said reciprocating member and extending toward said support; and a plurality of stripping devices extending between said cutters and removably mounted in said framework.

4. In an apparatus of the class described, the combination of a support; a framework above said support provided with vertical guides; a member adapted to move toward and from said support within said guides; a plurality of cutters having knife-edged ends mounted on said reciprocating member and extending toward said support; and a plurality of bars mounted in said framework and interposed between said cutters for stripping said cutters in their movement from said support.

5. In an apparatus of the class described, the combination of a support; a framework above said support with vertical guides; a member adapted to move toward and from said support within said guides; a plurality of cutters having knife-edged ends mounted on said reciprocating member and extending toward said support; a plurality of bars mounted in said framework and interposed between said cutters for stripping said cutters in their movement from said support; and means for locking said bars in operative position.

6. In an apparatus of the class described, the combination of a table; a standard thereon provided with guides; a framework hinged to said standard and provided with guides; means for securing the free end of said framework to said table; a member adapted to be moved toward and from said table within said guides; and a plurality of cutters extending from said member toward said table.

7. In an apparatus of the class described, the combination of a table; a standard thereon provided with guides; a framework hinged to said standard and provided with guides; means for securing the free end of said framework to said table; a member adapted to be moved toward and from said table within said guides; a plurality of cutters extending from said member toward said table; a pair of parallel arms secured to said standard parallel to said table; and a plurality of plates mounted in said arms and extending between said cutters.

8. In an apparatus of the class described, the combination of a table; a standard thereon provided with guides; a framework hinged to said standard and provided with guides; means for securing the free end of said framework to said table; a member adapted to be moved toward and from said table within said guides; a plurality of cutters extending from said member toward said table; a pair of parallel arms secured to said standard parallel to said table; and a plurality of removable plates mounted in said arms and extending between said cutters.

9. In an apparatus of the class described, the combination of a table; a standard thereon provided with guides; a framework hinged to said standard and provided with guides; means for securing the free end of said framework to said table; a member adapted to be moved toward and from said table within said guides; a plurality of cutters extending from said member toward said table; a pair of parallel arms secured to said standard parallel to said table; a plurality of removable plates mounted in said arms and extending between said cutters; and a device for locking said plates in operative position.

10. In an apparatus of the class described, the combination of a table; a standard thereon provided with guides; a framework hinged to said standard and provided with guides; means for securing the free end of said framework to said table; a member adapted to be moved toward and from said table within said guides; a plurality of cutters extending from said member toward said table; a pair of parallel arms secured to said standard; and a notched plate secured to said hinged framework adapted to engage with said arms to register them when in operative position.

11. In an apparatus of the class described, the combination of a table; a standard thereon provided with guides; a framework hinged to said standard and provided with guides; means for securing the free end of said framework to said table; a member adapted to be moved toward and from said table within said guides; a plurality of cutters extending from said member toward said table; a pair of parallel arms secured to said standard; a notched plate secured to said hinged framework adapted to engage with said arms to register them when in operative position; and another plate secured to said hinged framework coöperating with said notched plate to retain said arms in fixed position during the operation of the device.

12. In an apparatus of the class described, the combination of a support; a member adapted to move toward and from said support; and a plurality of semi-circular cutters mounted on said reciprocating member and extending toward said support each of said cutters being provided at its puncturing end with a sharp point on each side of its center.

13. In an apparatus of the class described, the combination of a support; a framework above said support provided with guides; a member adapted to move toward and from said support within said guides; a plurality of plates pivoted to said member; and a plurality of cutters secured to each of said pivoted plates.

14. In an apparatus of the class described, the combination of a support; a framework above said support provided with guides; a member adapted to move toward and from said support within said guides; a plurality of plates pivoted to said member; a plurality of cutters having knife-edged ends secured to each of said pivoted plates; and means secured to said reciprocating member for locking said plates in operative position.

15. In an apparatus of the class described, the combination of a support; a framework above said support provided with guides; a member adapted to move toward and from said support within said guides; a plurality of plates pivoted to said member; a plurality of cutters having knife-edged ends secured to each of said pivoted plates; and a pin extending through said member and said pivoted plates to lock the latter in operative position.

16. In an apparatus of the class described, the combination of a support; a framework above said support provided with guides; a U-shaped member adapted to move toward and from said support within said guides; a plurality of plates pivoted to the side walls of said U-shaped member; a plurality of cutters having knife-edged ends secured to each of said plates; and a pin extending through the walls of said U-shaped member and said pivoted plates to lock the latter in operative position.

17. In an apparatus of the class described, the combination of a table; a vertical standard secured to said table and provided with side guide plates; a top plate hinged to said standard; an end plate hinged to said top plate and provided with side guides; means for securing said end plate to said table parallel with said standard; a member adapted to reciprocate in said guides toward and from said table; means for causing said reciprocation; and a plurality of cutters mounted on said reciprocating member and extending toward said table.

18. In an apparatus of the class described, the combination of a table; a vertical standard secured to said table and provided with side guide plates; a top plate hinged to said standard; an end plate hinged to said top plate and provided with side guides; means for securing said end plate to said table parallel with said standard; a member adapted to reciprocate in said guides toward and from said table; a lever pivoted to said top plate; a link between said lever and reciprocating member; and a plurality of cutters mounted on said reciprocating member and extending toward said table.

19. In an apparatus of the class described, the combination of a table; a vertical standard secured to said table and provided with side guide plates; a top plate hinged to said standard; an end plate hinged to said top plate and provided with side guides; means for securing said end plate to said table parallel with said standard; a member adapted to reciprocate in said guides toward and from said table; a lever pivoted to said top plate; a link between said lever and reciprocating member; a stop secured to said top plate to limit the downward movement of said lever; and a plurality of cutters mounted on said reciprocating member and extending toward said table.

Signed by me at #7 Water st., Boston, Mass., this 21st day of January, 1908.

GEORGE W. WEMPLE.

Witnesses:
   WALTER E. LOMBARD,
   EDNA C. CLEVELAND.